US012322559B2

(12) United States Patent
Ho

(10) Patent No.: US 12,322,559 B2
(45) Date of Patent: Jun. 3, 2025

(54) LOW-TRAVEL KEY DEVICE

(71) Applicant: SUNREX TECHNOLOGY CORP., Taichung (TW)

(72) Inventor: Shi-Yew Ho, Taichung (TW)

(73) Assignee: SUNREX TECHNOLOGY CORP., Taichung (TW)

( * ) Notice: Subject to any disclaimer, the term of this patent is extended or adjusted under 35 U.S.C. 154(b) by 122 days.

(21) Appl. No.: 18/449,288

(22) Filed: Aug. 14, 2023

(65) Prior Publication Data

US 2024/0404769 A1 Dec. 5, 2024

(30) Foreign Application Priority Data

Jun. 2, 2023 (TW) ................................ 112120731

(51) Int. Cl.

*H01H 13/14* (2006.01)
*H01H 13/04* (2006.01)
*H01H 13/10* (2006.01)
*H01H 13/52* (2006.01)

(52) U.S. Cl.

CPC ............ *H01H 13/14* (2013.01); *H01H 13/04* (2013.01); *H01H 13/10* (2013.01); *H01H 13/52* (2013.01)

(58) Field of Classification Search

CPC ........ H01H 13/14; H01H 13/04; H01H 13/10; H01H 13/52; H01H 3/122; H01H 3/125; H01H 13/70; H01H 13/7065

See application file for complete search history.

(56) References Cited

U.S. PATENT DOCUMENTS 11,631,555 B2 * 4/2023 Horiuchi ............ H01H 13/7065 200/344

FOREIGN PATENT DOCUMENTS

TW M594794 5/2020

* cited by examiner

*Primary Examiner* — Lheiren Mae A Caroc
(74) *Attorney, Agent, or Firm* — Burris Law, PLLC

(57) ABSTRACT

A low-travel key device includes a plate body, first and second stop sets, and a frame unit located between the first and second stop sets and including first and second frame members. The first frame member includes two first support arms each having a first end portion, and a first bight portion. The second frame member includes two second support arms each having a second end portion pivotally connected to the first end portion of a respective first support arm, and a second bight portion. A keycap is connected to the first and second bight portions, and is movable relative to the plate body between a non-depressed position, in which the first and second bight portions are away from the plate body, and a depressed position, in which the first and second bight portions are adjacent to the plate body.

10 Claims, 15 Drawing Sheets

LOW-TRAVEL KEY DEVICE

CROSS-REFERENCE TO RELATED APPLICATION

This application claims priority to Taiwanese Invention Patent application Ser. No. 112120731, filed on Jun. 2, 2023.

FIELD

The present disclosure relates to a key device, and more particularly to a low-travel key device.

BACKGROUND

An existing key device, as disclosed in Taiwanese Utility Model Patent No. M594794U, includes a base, a keycap disposed above the base, and a press balance assembly disposed between the base and the keycap. The press balance assembly includes a first balance frame coupled between the base and the keycap, a second balance frame coupled between the base and the keycap and spaced apart from the first balance frame along a horizontal direction, and a tension spring connected between the first and second balance frames. The base has a base plate, and two mounting arms extending upwardly from two sides of the base plate. Each mounting arm has two insertion holes.

The first balance frame includes a first horizontal rod pivoted to the keycap, two first vertical rods respectively connected to two opposite sides of the first horizontal rod, and two first insert blocks respectively protruding from the first vertical rods. The second balance frame includes a second horizontal rod pivoted to the keycap, two second vertical rods respectively connected to two opposite sides of the second horizontal rod, and two second insert blocks respectively protruding from the second vertical rods. Each first insert block and each second insert block are respectively and rotatably inserted into the insertion holes of a corresponding one of the mounting arms. When the keycap is pressed, the first and second balance frames swing up and down to obtain a pressing balance.

When the keycap is pressed to move the first and second balance frame, since the first insert blocks of the first balance frame are not movable relative to the insertion holes, the first horizontal bar of the first balance frame will move down an arc about an axis passing through the first insert blocks. Similarly, the second horizontal rod of the second balance frame will also move down an arc about an axis passing through the second insert blocks. This will result in slight shaking of the keycap along the horizontal direction due to movement of the first and second horizontal rods away from each other along the horizontal direction and produce a slight displacement when the keycap moves down. When the corner of the keycap is pressed, the shaking caused by the downward movement of the keycap will be larger, thereby resulting in unsmooth pressing and poor stability.

SUMMARY

Therefore, an object of the present disclosure is to provide a low-travel key device that can alleviate at least one of the drawbacks of the prior art.

Accordingly, the low-travel key device of this disclosure includes a base plate unit, a frame unit, and a keycap. The base plate unit includes a plate body, a first stop set extending upwardly from the plate body, and a second stop set extending upwardly from the plate body and spaced apart from the first stop set in a left-right direction. The frame unit is located between the first and second stop sets, and includes first and second frame members. The first frame member includes two first support arms spaced apart from each other in a front-rear direction transverse to the left-right direction, and a first bight portion connected between the first support arms and adjacent to the first stop set. Each first support arm has a first end portion, and a first arm portion connected between the first end portion and the first bight portion. The second frame member includes two second support arms spaced apart from each other in the front-rear direction, and a second bight portion connected between the second support arms and adjacent to the second stop set. Each second support arm has a second end portion pivotally connected to the first end portion of a respective one of the first support arms, and a second arm portion connected between the second end portion and the second bight portion.

The keycap is connected to the first and second bight portions such that the first and second bight portions are rotatable relative to the keycap and such that the keycap is movable relative to the plate body between a non-depressed position and a depressed position. When the keycap is in the non-depressed position, the keycap and the first and second bight portions are away from the plate body. When the keycap is moved from the non-depressed position to the depressed position, the first and second bight portions respectively abut against the first and second stop sets and move straight down toward the plate body. When the keycap is in the depressed position, the keycap is adjacent to the plate body, and the first and second bight portions respectively abut against the first and second stop sets and are adjacent to the plate body.

BRIEF DESCRIPTION OF THE DRAWINGS

Other features and advantages of the disclosure will become apparent in the following detailed description of the embodiment with reference to the accompanying drawings. It is noted that various features may not be drawn to scale.

DETAILED DESCRIPTION

The present disclosure is described in detail below in connection with the accompanying drawings and embodiments, and before the present disclosure is described in detail, it should be noted that the relative positional terms used in the following description, such as “front”, “back”, “left”, “right”, “upper”, “lower”, are based on the orientation shown in each figure and the normal use orientation.

Figure 1:
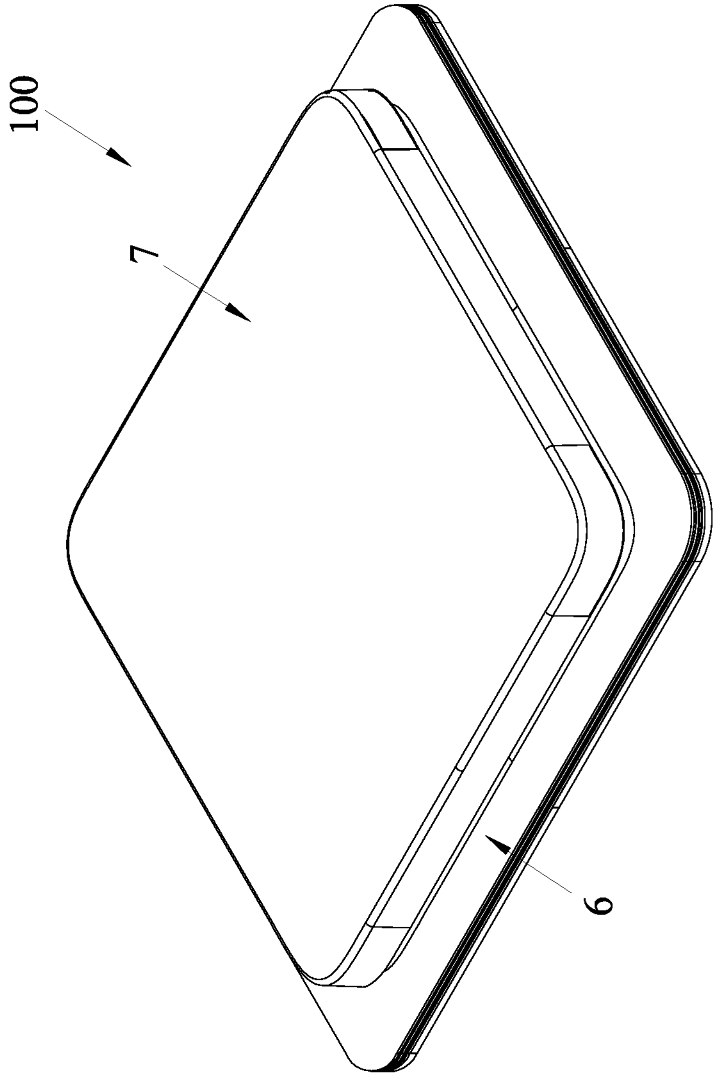
FIG. 1 is a perspective view of a low-travel key device according to an embodiment of the present disclosure.
Figure 2:
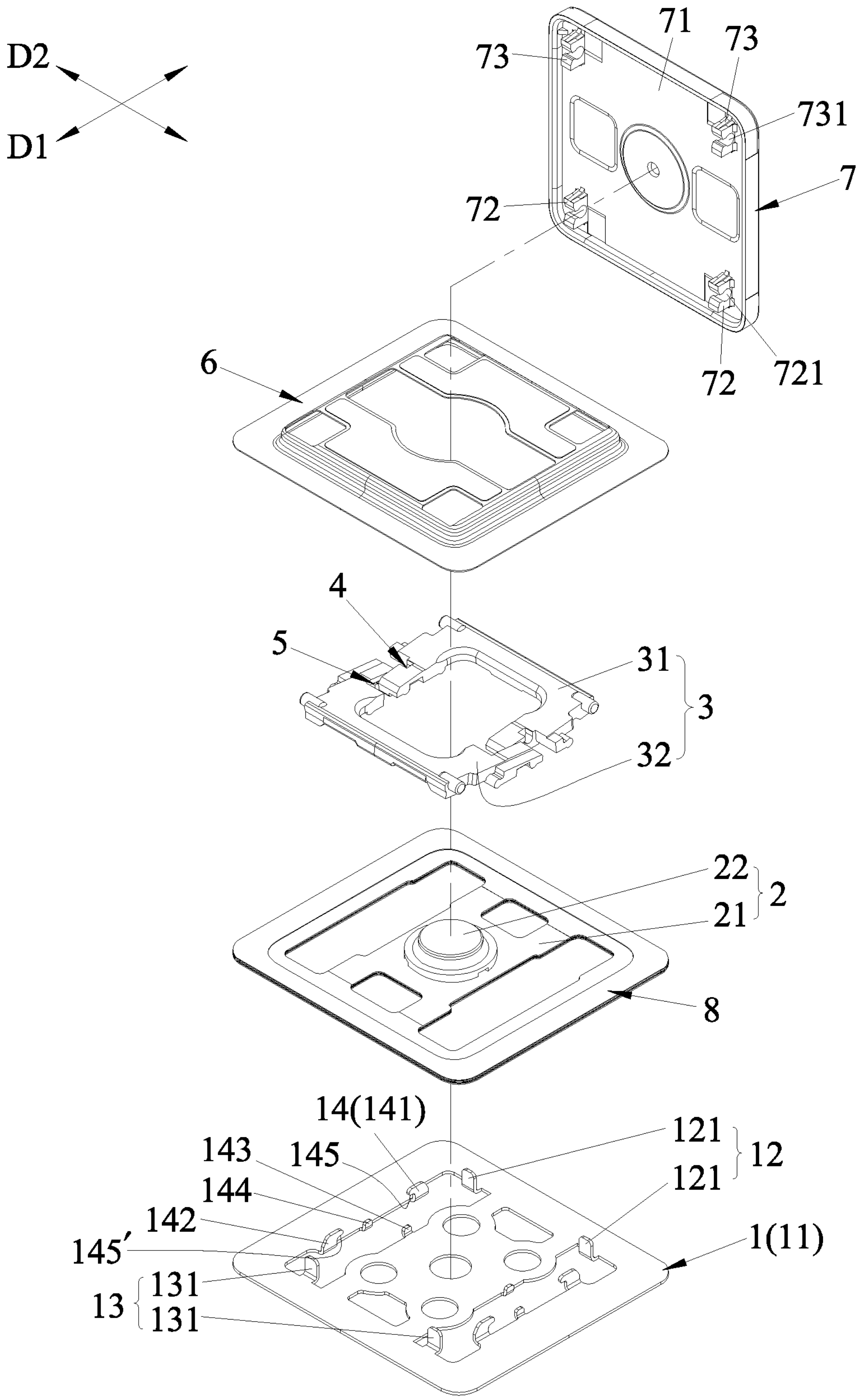
FIG. 2 is an exploded perspective view of the embodiment.
Figure 3:
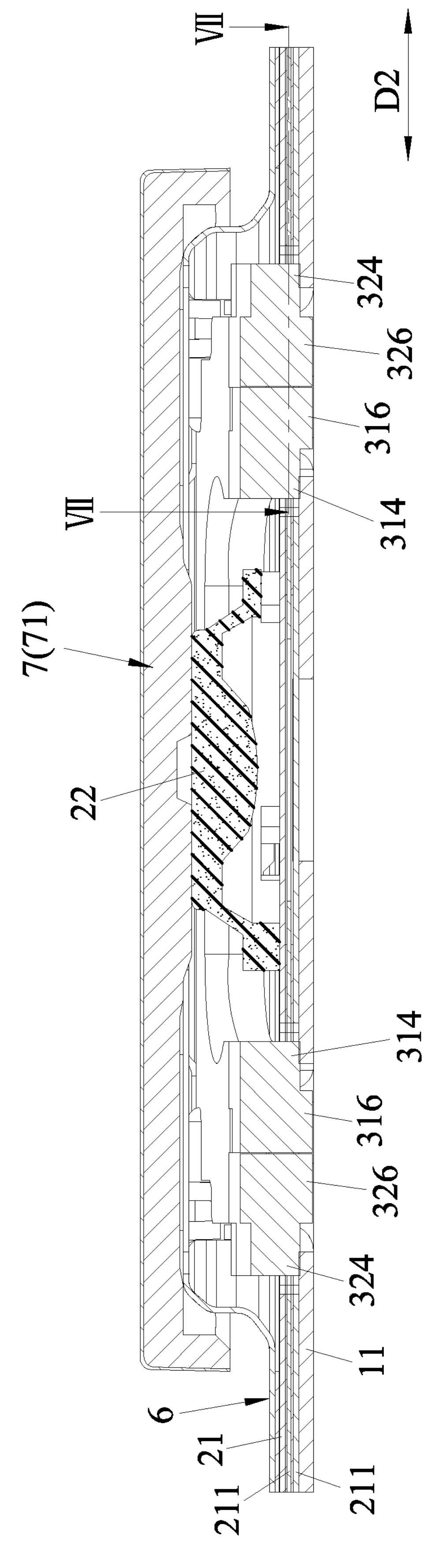
FIG. 3 is an assembled sectional view of the embodiment, illustrating a keycap in a non-depressed position relative to a plate body of a base plate unit.

Referring to FIGS. 1 to 3, a low-travel key device 100 according to an embodiment of the present disclosure includes a base plate unit 1, a driving unit 2, a frame unit 3, a first pivot connecting unit 4, a second pivot connecting unit 5, a keyframe 6, and a keycap 7.

The base plate unit 1 includes a plate body 11, a first stop set 12 extending upwardly from the plate body 11, a second stop set 13 extending upwardly from the plate body 11 and spaced apart from the first stop set 12 in a left-right direction (D1), and two limiting assemblies 14 disposed on the plate body 11 between the first and second stop sets 12, 13 and spaced apart from each other in a front-rear direction (D2) transverse to the left-right direction (D1).

The first stop set 12 has two first stop walls 121 extending upwardly from the plate body 1 and spaced apart from each other in the front-rear direction (D2). The second stop set 13 has two second stop walls 131 extending upwardly from the plate body 1 and spaced apart from each other in the front-rear direction (D2).

Each limiting assembly 14 includes a first limiting portion 141, a second limiting portion 142, a third limiting portion 143, and a fourth limiting portion 144 all protruding upwardly from the plate body 11.

The first limiting portion 141 and the second limiting portion 142 of each limiting assembly 14 are spaced apart from each other in the left-right direction (D1). The first limiting portion 141 defines an engaging groove 145. The second limiting portion 142 defines an engaging groove 145' facing the engaging groove 145 of the first limiting portion 141. The third limiting portion 143 of each limiting assembly 14 is located spaced apart from the first and second limiting portions 141, 142 in the front-rear direction (D2). The fourth limiting portion 144 of each limiting assembly 14 is located between the first and second limiting portions 141, 142. The fourth limiting portion 144 and the third limiting portion 143 are staggered relative to each other in the front-rear direction (D2).

With reference to FIGS. 2 and 3, the driving unit 2 includes a hollow thin film circuit board 21 disposed on the plate body 11, and an elastic body 22 disposed on a central portion of the thin film circuit board 21. The thin film circuit board 21 is composed of a plurality of stacked base layers 211. The first stop set 12, the second stop set 13 and the limiting assemblies 14 extend upwardly through hollow portions of the thin film circuit board 21.

Figure 4:
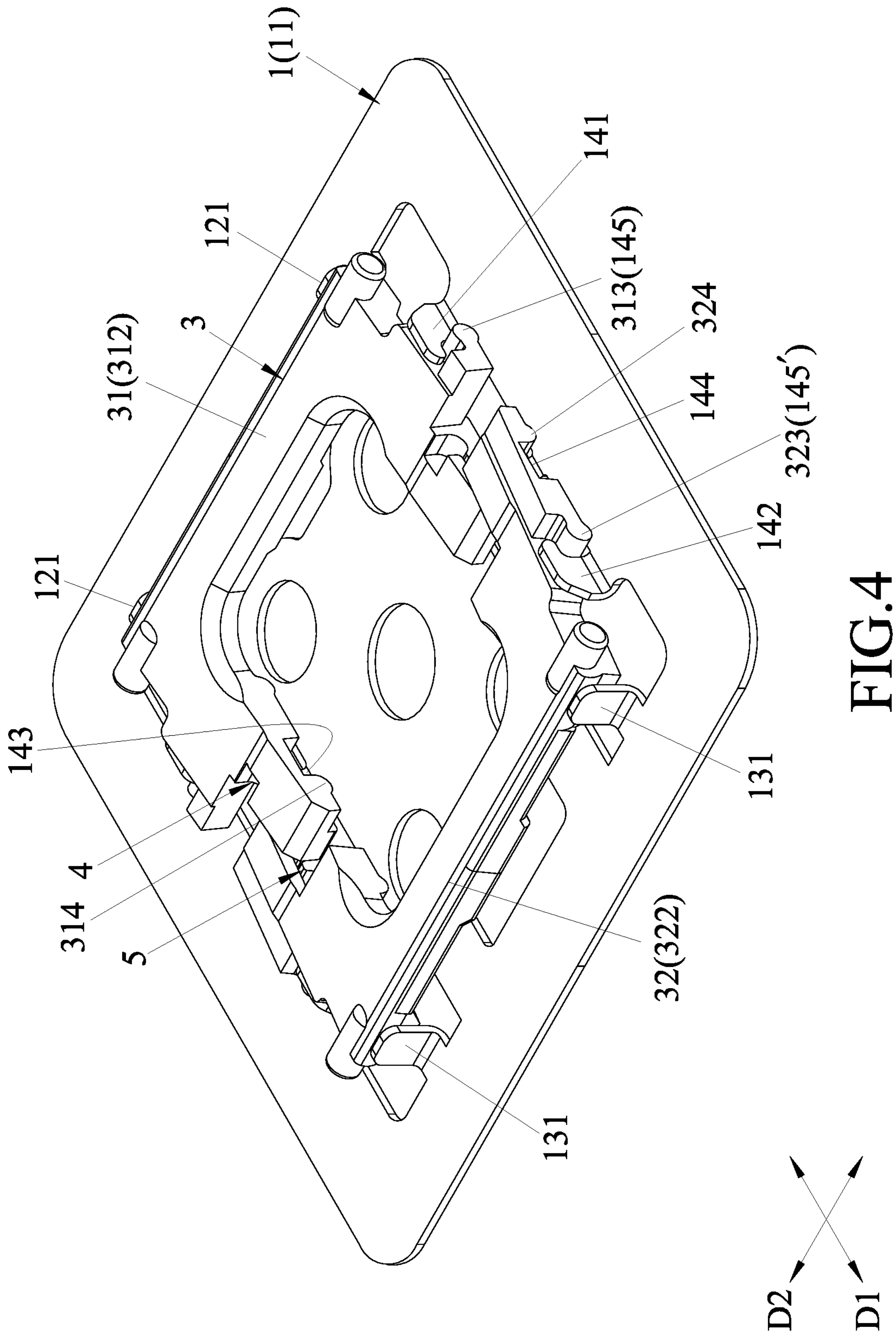
FIG. 4 is an assembled perspective view of the base plate unit and a frame unit of the embodiment.
Figure 5:
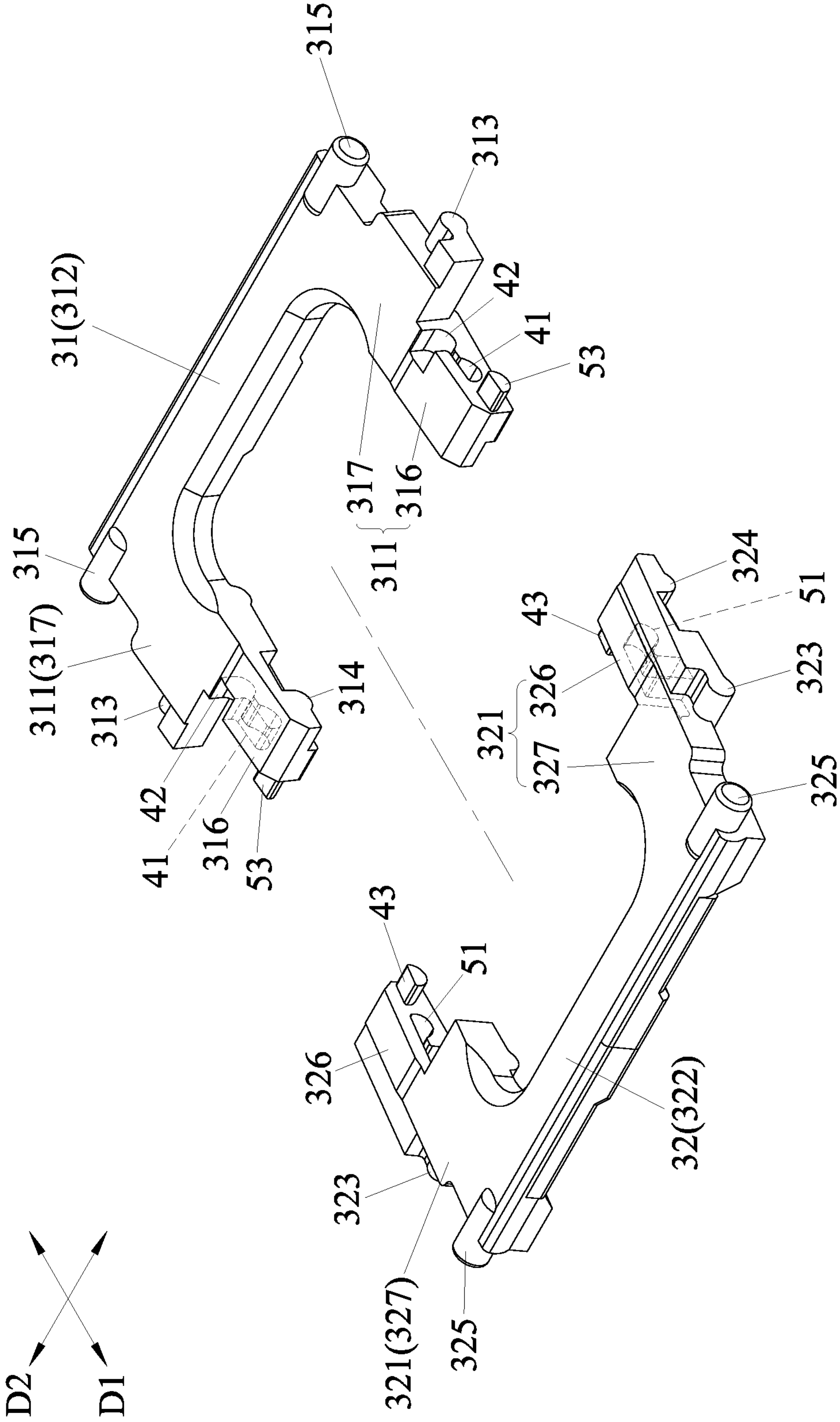
FIG. 5 is an exploded perspective view of the frame unit of the embodiment.
Figure 6:
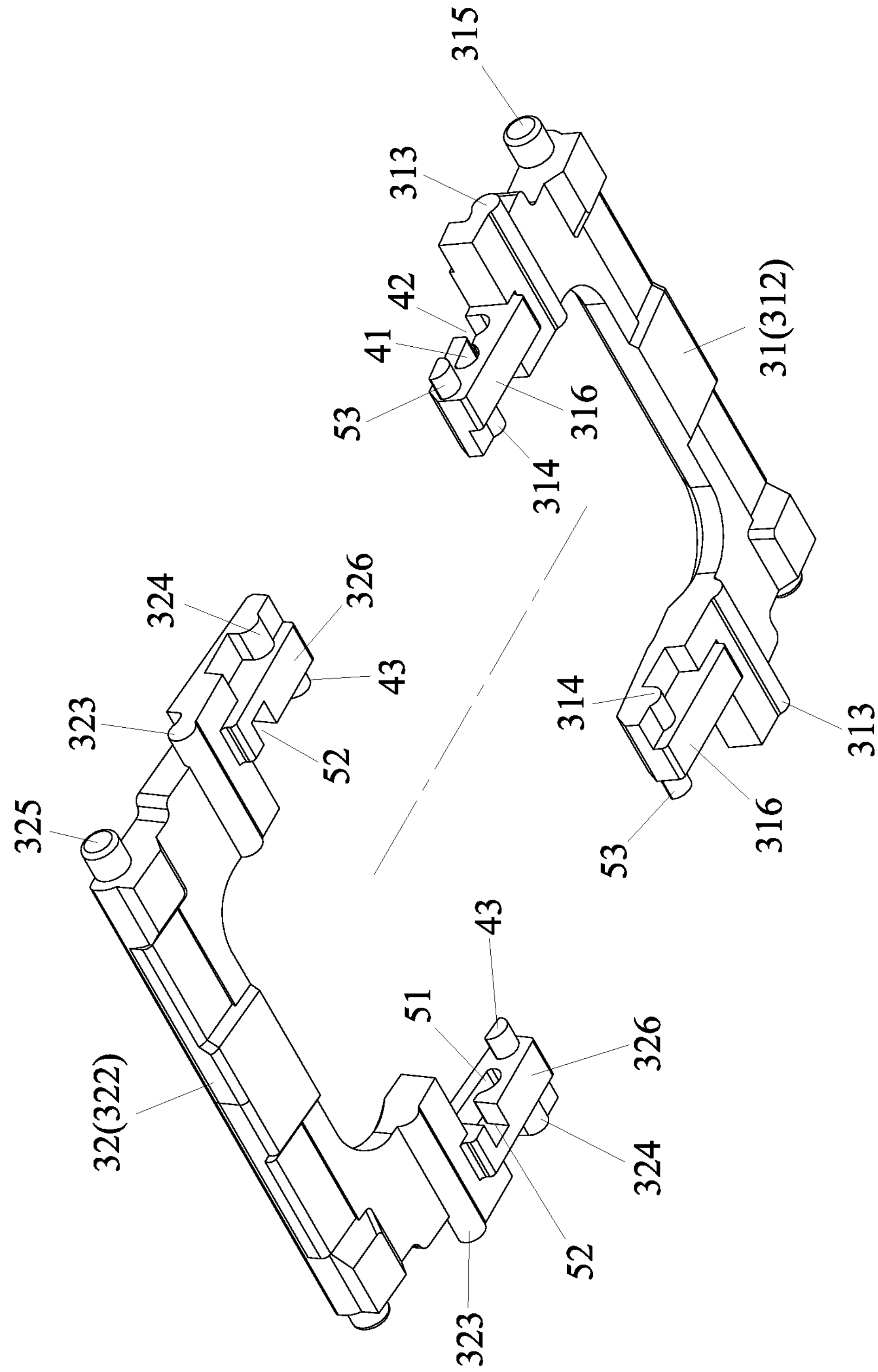
FIG. 6 is an exploded perspective view of the frame unit of the embodiment taken from another angle.

Referring to FIGS. 4 to 6, the frame unit 3 is located between the first and second stop sets 12, 13, and includes a first frame member 31 and a second frame member 32. The first frame member 31 includes two first support arms 311, a first bight portion 312 connected between the first support arms 311, two first engaging blocks 313, two first protruding portions 314, and two first engaging pins 315.

The first support arms 311 are spaced apart from each other in the front-rear direction (D2). Each first support arm 311 has a first end portion 316, and a first arm portion 317 connected between the first end portion 316 and the first bight portion 312. The first bight portion 312 is connected between the first arm portions 317 of the first support arms 311, and abuts against the first stop walls 121. The first engaging blocks 313 are respectively connected to outer lateral sides of the first arm portions 317, and engage movably and respectively the engaging grooves 145 of the first limiting portions 141 of the limiting assemblies 14 in the left-right direction (D1). The first protruding portions 314 are respectively connected to inner lateral sides of the first end portions 316 of the first support arms 311. The first engaging pins 315 are connected to two opposite sides of the first bight portion 312 in the front-rear direction (D2). Each first engaging pin 315 is cylindrical.

The second frame member 32 includes two second support arms 321, a second bight portion 322 connected between the second support arms 321, two second engaging blocks 323, two second protruding portions 324, and two second engaging pins 325.

The second support arms 321 are spaced apart from each other in the front-rear direction (D2). Each second support arm 321 has a second end portion 326 pivotally connected to the first end portion 316 of a respective one of the first support arms 311, and a second arm portion 327 connected between the second end portion 326 and the second bight portion 322. The second bight portion 322 is connected between the second arm portions 327 of the second support arms 321, and abuts against the second stop walls 131. The second engaging blocks 323 are respectively connected to outer lateral sides of the second arm portions 327, and engage movably and respectively the engaging grooves 145' of the second limiting portions 142 of the limiting assemblies 14 in the left-right direction (D1). The second protruding portions 324 are respectively connected to outer lateral sides of the second end portions 326 of the second support arms 321. Each second protruding portion 324 is located on a same side as a respective one of the second engaging blocks 323. The second engaging pins 325 are connected to two opposite sides of the second bight portion 322 in the front-rear direction (D2). Each second engaging pin 325 is cylindrical.

Figure 7:
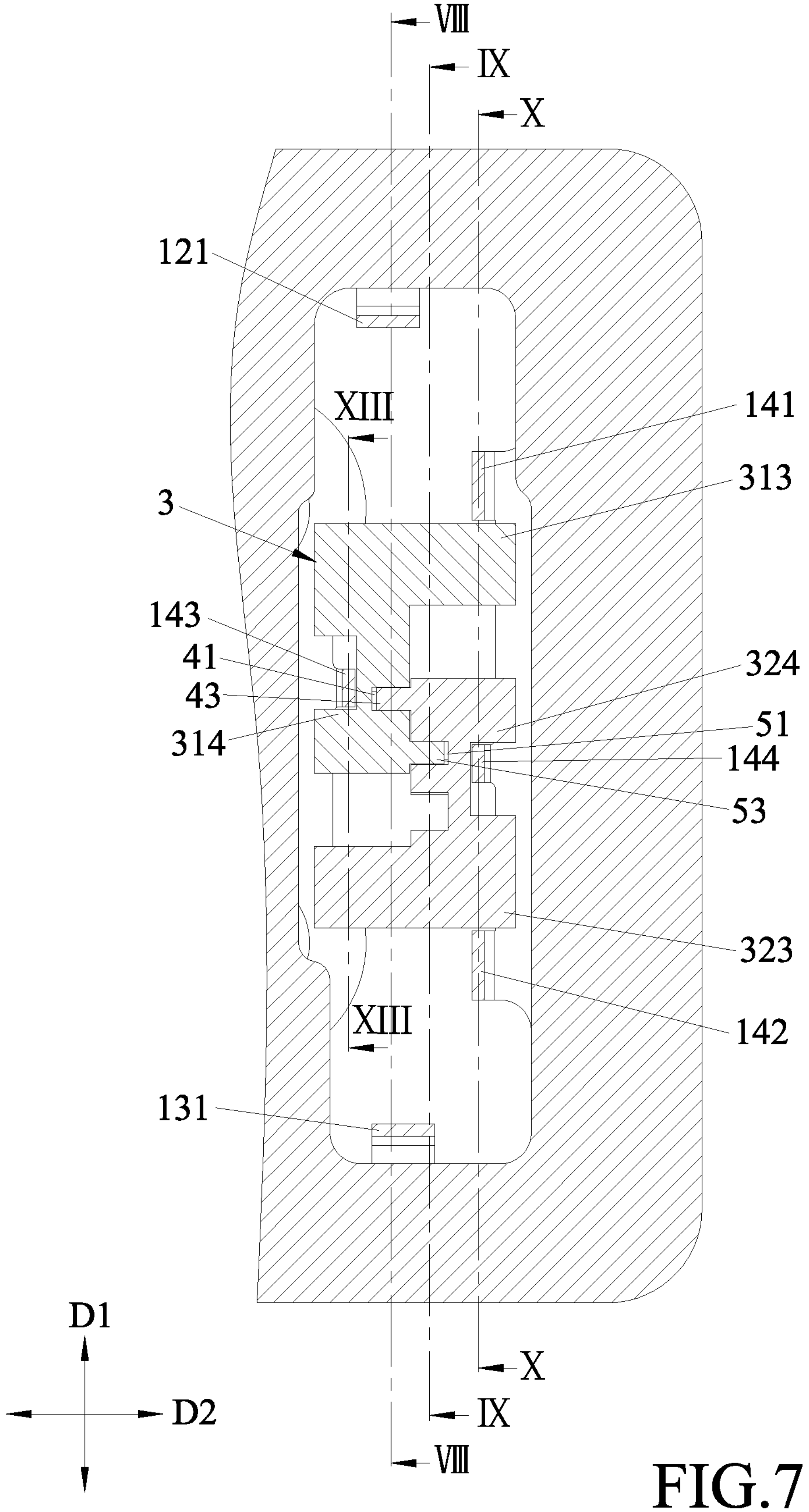
FIG. 7 is a fragmentary sectional view taken along line VII-VII of FIG. 3.

Referring to FIG. 7, in combination with FIG. 4, after the first and second frame members 31, 32 are pivotally connected to each other and are mounted on the plate body 11 of the base plate unit 1, each first engaging block 313 is engaged to the engaging groove 145 of the respective first limiting portion 141, each second engaging block 323 is engaged to the engaging groove 145' of the respective second limiting portion 142, each first protruding portion 314 is located between the third limiting portion 143 of one of the limiting assemblies 14 and a corresponding one of the second stop walls 131, and each second protruding portion 324 is located between the fourth and first limiting portions 144, 141 of the corresponding limiting assembly 14. Since, in this embodiment, the structures of the first support arms 311 of the first frame member 31 are the same, and the structures of the second support arms 321 of the second frame member 32 are also the same, FIG. 7 only illustrates the structure at one side of the first and second frame members 31, 32.

Figure 8:
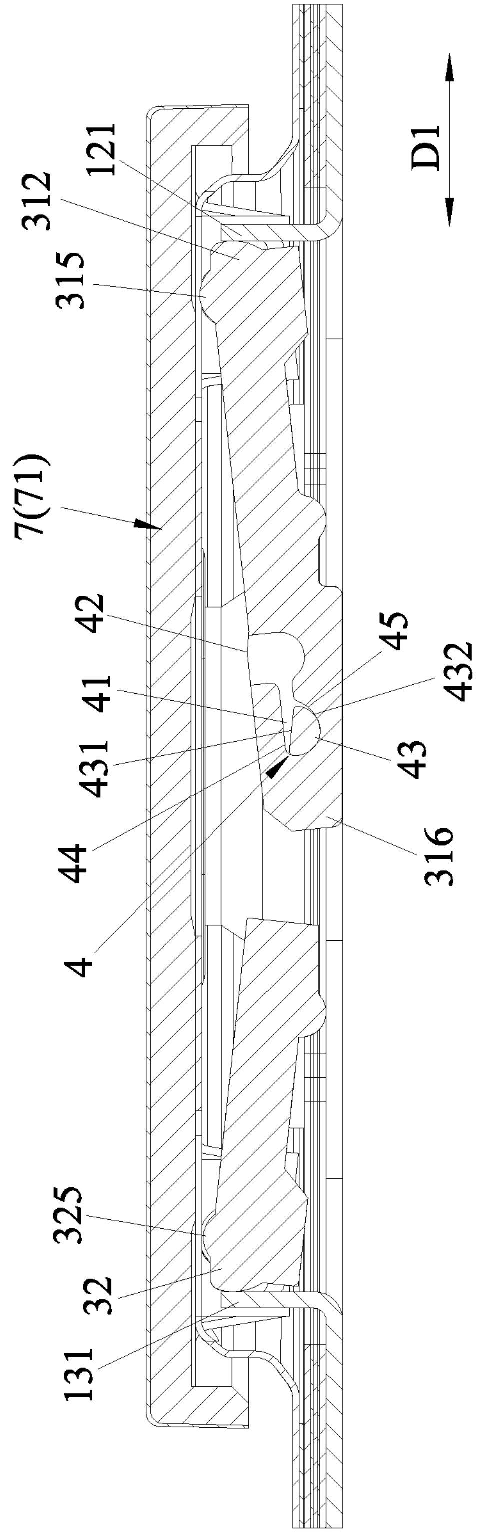
FIG. 8 is a fragmentary sectional view taken along line VIII-VIII of FIG. 7.

Referring to FIG. 8, in combination with FIGS. 5 and 6, the first pivot connecting unit 4 includes two first pivot grooves 41 extending inwardly and respectively from outer lateral sides of the first end portions 316 of the first support arms 311, two first notches 42 respectively formed in the outer lateral sides of the first end portions 316 and respectively communicating with the first pivot grooves 41, and two first protruding pins 43 respectively disposed on inner lateral sides of the second end portions 326 of the second support arms 321.

Each first pivot groove 41 is cooperatively defined by an upper surface 44 that is planar and a lower surface 45 that is concave and that is disposed below the upper surface 44. Each first notch 42 opens upwardly, and is located between one of the first pivot grooves 41 and the first arm portion 317 of a corresponding one of the first support arms 311. Each first notch 42 and a respective one of the first pivot grooves 41 are located on a same side as a corresponding first engaging block 313.

Each first protruding pin 43 is inserted into a respective one of the first pivot grooves 41 through the respective first notch 42, and is rotatably engaged with the respective first pivot groove 41. Each first protruding pin 43 is semi-cylindrical, and has a planar surface 431 facing the upper surface 44 of the respective first pivot groove 41, and a curved surface 432 facing the lower surface 45 of the respective first pivot groove 41.

Figure 9:
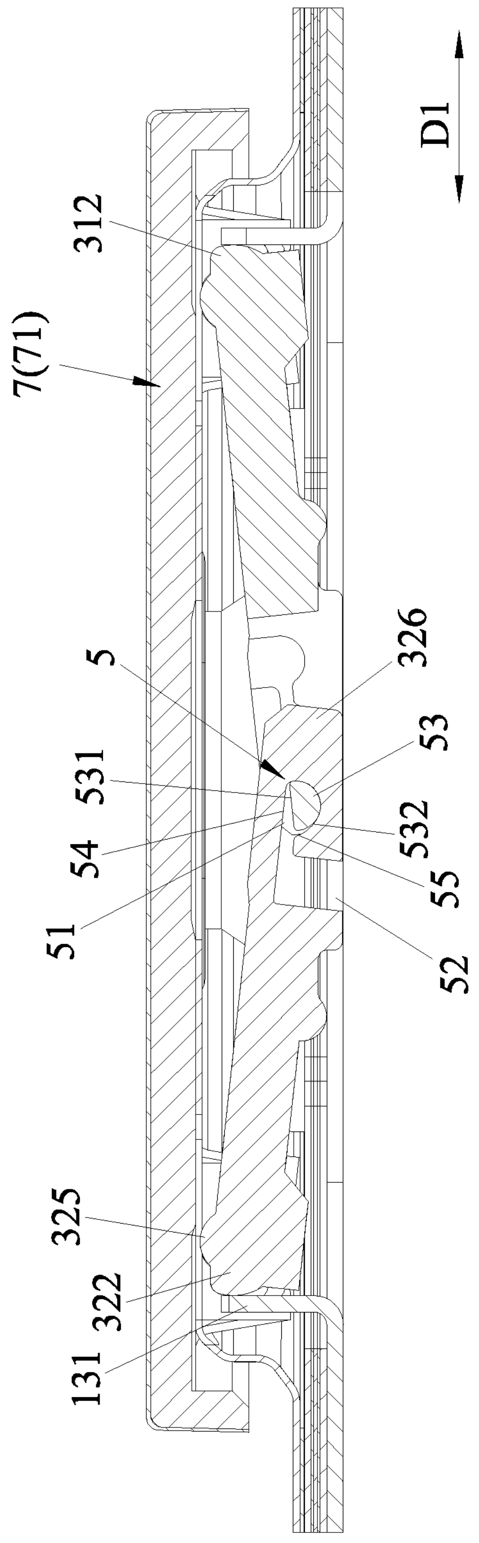
FIG. 9 is a fragmentary sectional view taken along line IX-IX of FIG. 7.

Referring to FIG. 9, in combination with FIGS. 5 and 6, the second pivot connecting unit 5 includes two second pivot grooves 51 extending inwardly and respectively from the inner lateral sides of the second end portions 326 of the second support arms 321, two second notches 52 respectively formed in the inner lateral sides of the second end portions 326 and respectively communicating with the second pivot grooves 51, and two second protruding pins 53 respectively disposed on the outer lateral sides of the first end portions 316.

Each second pivot groove 51 is cooperatively defined by an upper surface 54 that is planar and a lower surface 55 that is concave and that is disposed below the upper surface 54. Each second notch 52 opens downwardly, and is located between one of the second pivot grooves 51 and the second arm portion 327 of a corresponding one of the second support arms 321. Each second pivot groove 51 and a respective one of the second notches 52 are located between one of the first protruding pins 43 and the second arm portion 327 of the corresponding second support arm 321.

Each second protruding pin 53 is inserted into a respective one of the second pivot grooves 51 through the respective second notch 52, and is rotatably engaged with the respective second pivot groove 51. Each second protruding pin 53 is semi-cylindrical, and has a planar surface 531 facing the upper surface 54 of the respective second pivot groove 51, and a curved surface 532 facing the lower surface 55 of the respective second pivot groove 51. Each first pivot groove 41 and a respective one of the first notches 42 are located between one of the second protruding pins 53 and the first arm portion 317 of the corresponding first support arm 311.

Figure 10:
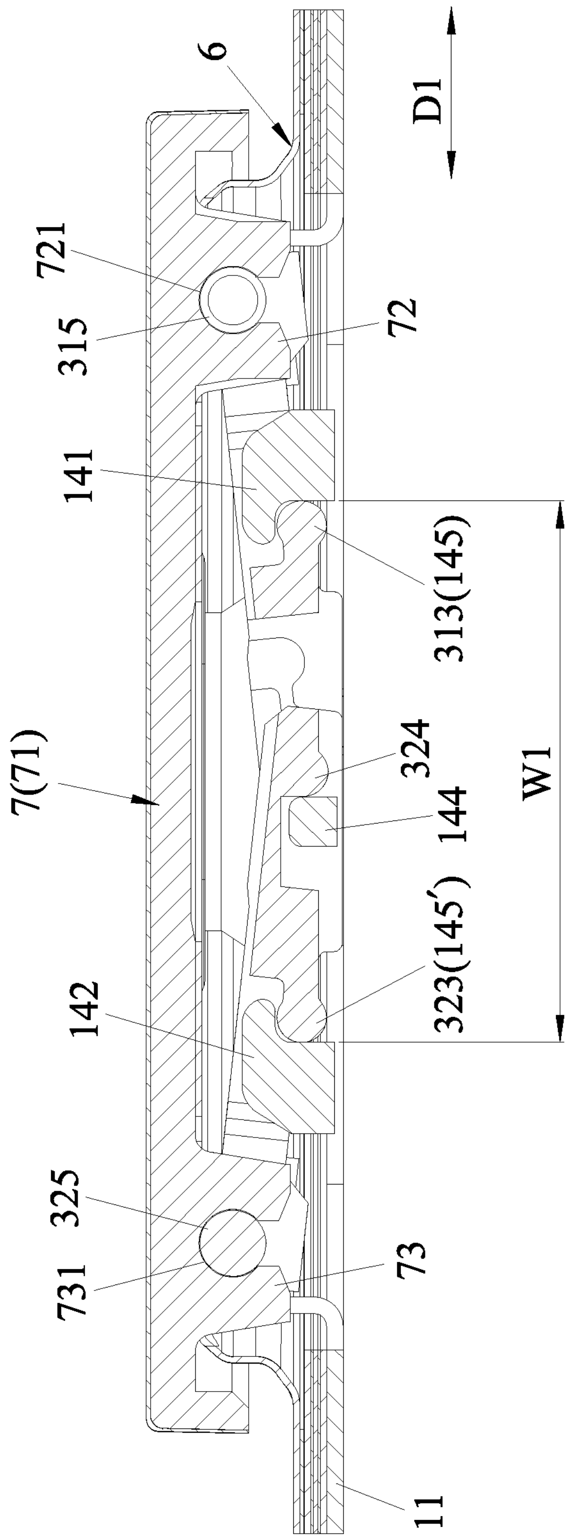
FIG. 10 is a fragmentary sectional view taken along line X-X of FIG. 7.

Referring to FIG. 10, in combination with FIG. 2, the keyframe 6 is made of an elastic material, and is connected to the thin film circuit board 21 through an annular adhesive layer 8. The keyframe 6 covers the frame unit 3 to prevent external dust from entering and contaminating the first and second frame members 31, 32, so that, when the frame unit 3 is actuated, the key can be prevented from being stuck.

The keycap 7 includes a cap body 71 disposed on top of the keyframe 6 and covering a central portion thereof, two first engaging portions 72 disposed on the cap body 71 and extending downwardly through the keyframe 6, and two second engaging portions 73 disposed on the cap body 71 spaced apart from the first engaging portions 72 in the left-right direction (D1) and extending downwardly through the keyframe 6. The first engaging portions 72 are spaced apart from each other in the front-rear direction (D2). The second engaging portions 73 are also spaced apart from each other in the front-rear direction (D2). The elastic body 22 elastically abuts between the thin film circuit board 21 and the cap body 71. Each first engaging portion 72 has a first engaging groove 721 engaging a respective one of the first engaging pin 315. The first engaging groove 721 of each first engaging portion 72 opens downwardly, and has a circular cross section matching with a shape of the respective first engaging pin 315 such that each first engaging pin 315 is rotatable relative to the first engaging groove 721 of a respective one of the first engaging portions 72, but is not movable relative to the first engaging groove 721 of the respective first engaging portion 72 in the left-right direction (D1). Each second engaging portion 73 has a second engaging groove 731 engaging a respective one of the second engaging pins 325. The second engaging groove 731 of each second engaging portion 73 opens downwardly, and has a circular cross section matching with a shape of the respective second engaging pin 325 such that each second engaging pin 325 is rotatable relative to the second engaging groove 731 of a respective one of the second engaging portions 73, but is not movable relative to the second engaging groove 731 of the respective second engaging portion 73 in the left-right direction (D1). Through the aforesaid configuration, the first and second bight portions 312, 322 are rotatable relative to the keycap 7, and the keycap 7 is movable relative to the plate body 11 between a non-depressed position and a depressed position.

Figure 11A:
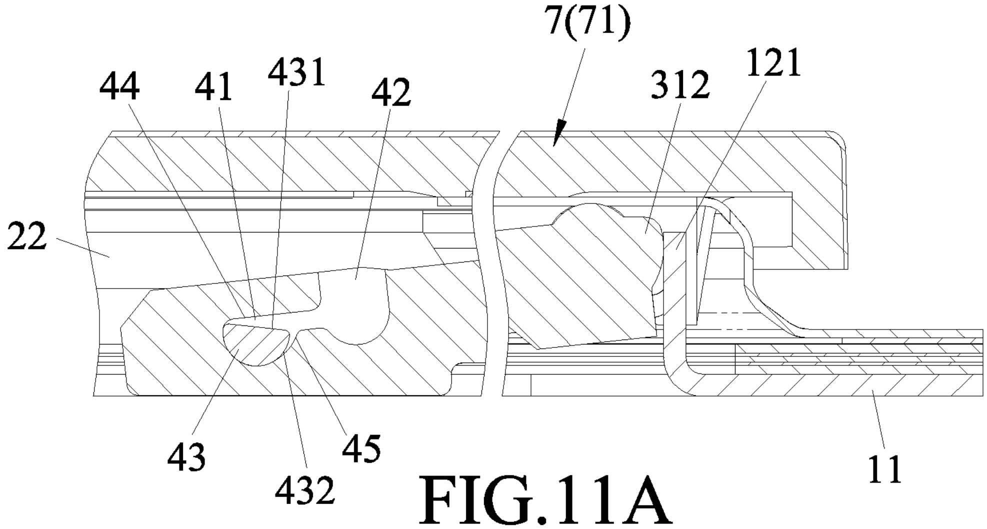
FIG. 11A is an enlarged fragmentary sectional view of FIG. 8.
Figure 12A:
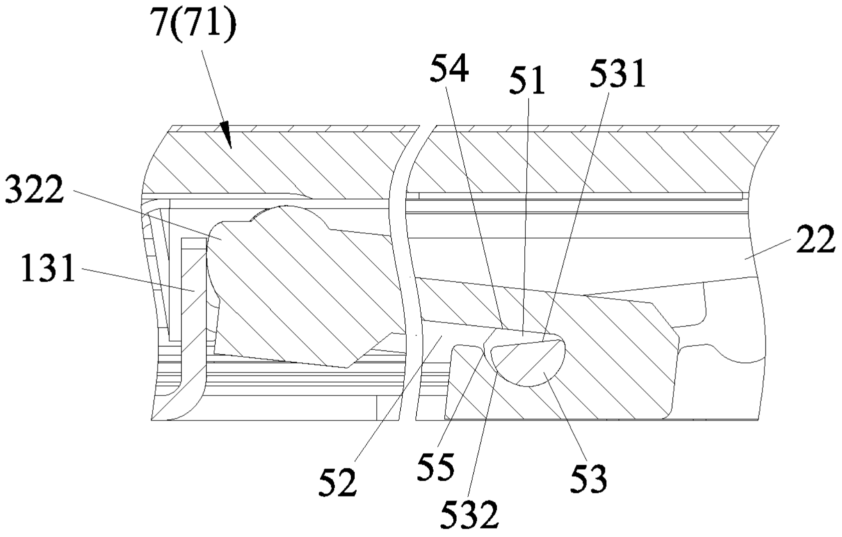
FIG. 12A is an enlarged fragmentary sectional view of FIG. 9.
Figure 13:
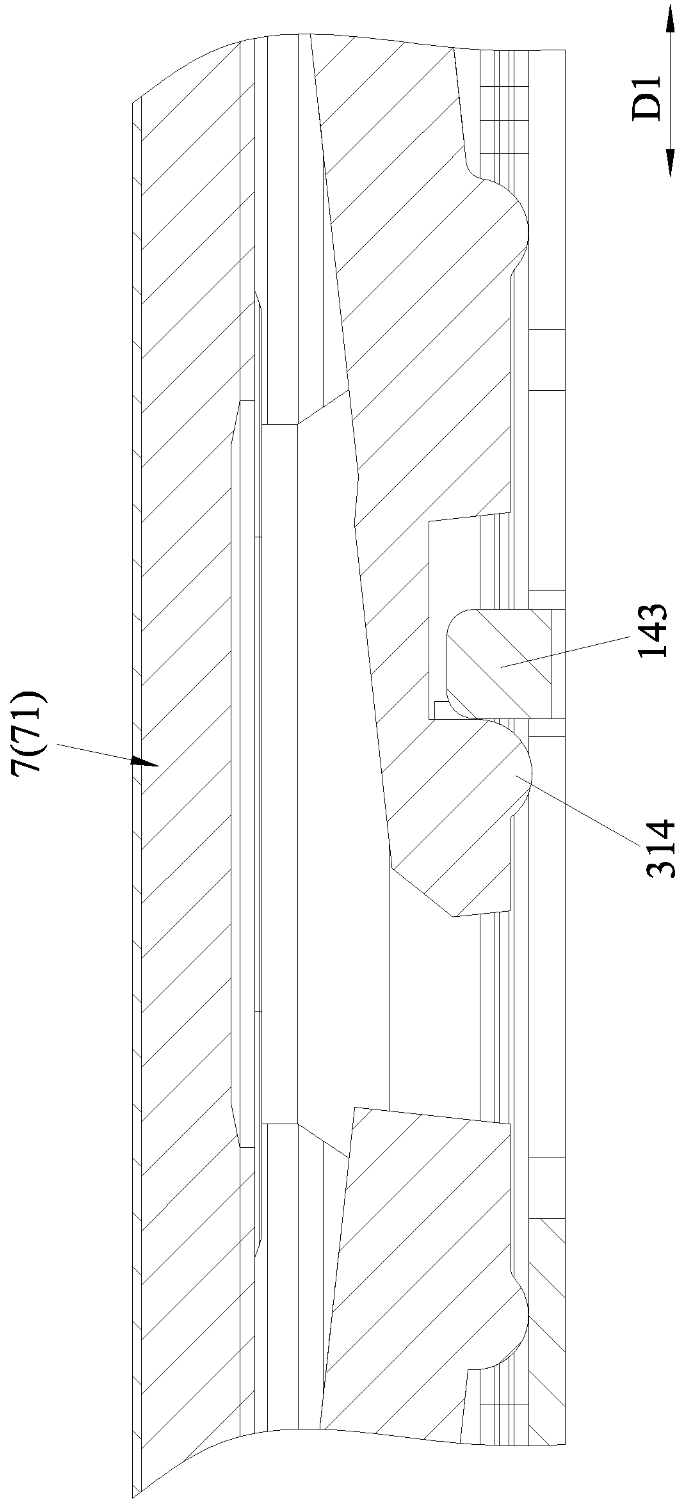
FIG. 13 is an enlarged fragmentary sectional view taken along line XIII-XIII of FIG. 7.
Figure 14:
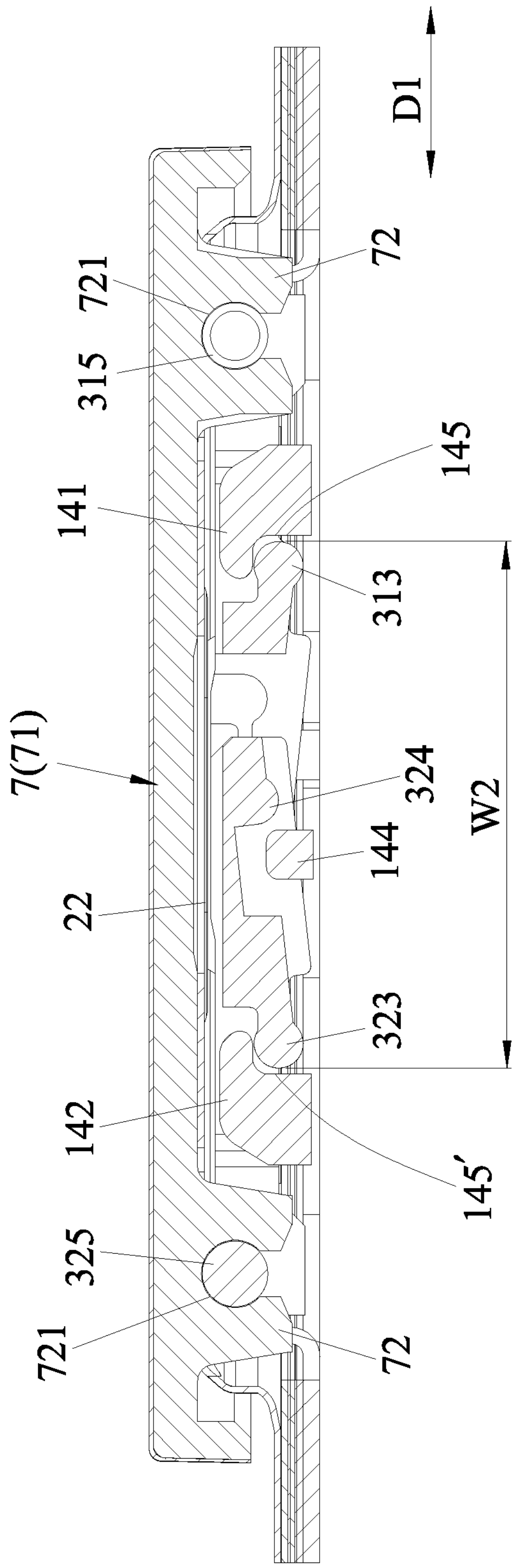
FIG. 14 is a view similar to FIG. 10, but with the keycap in the non-depressed position.
Figure 15:
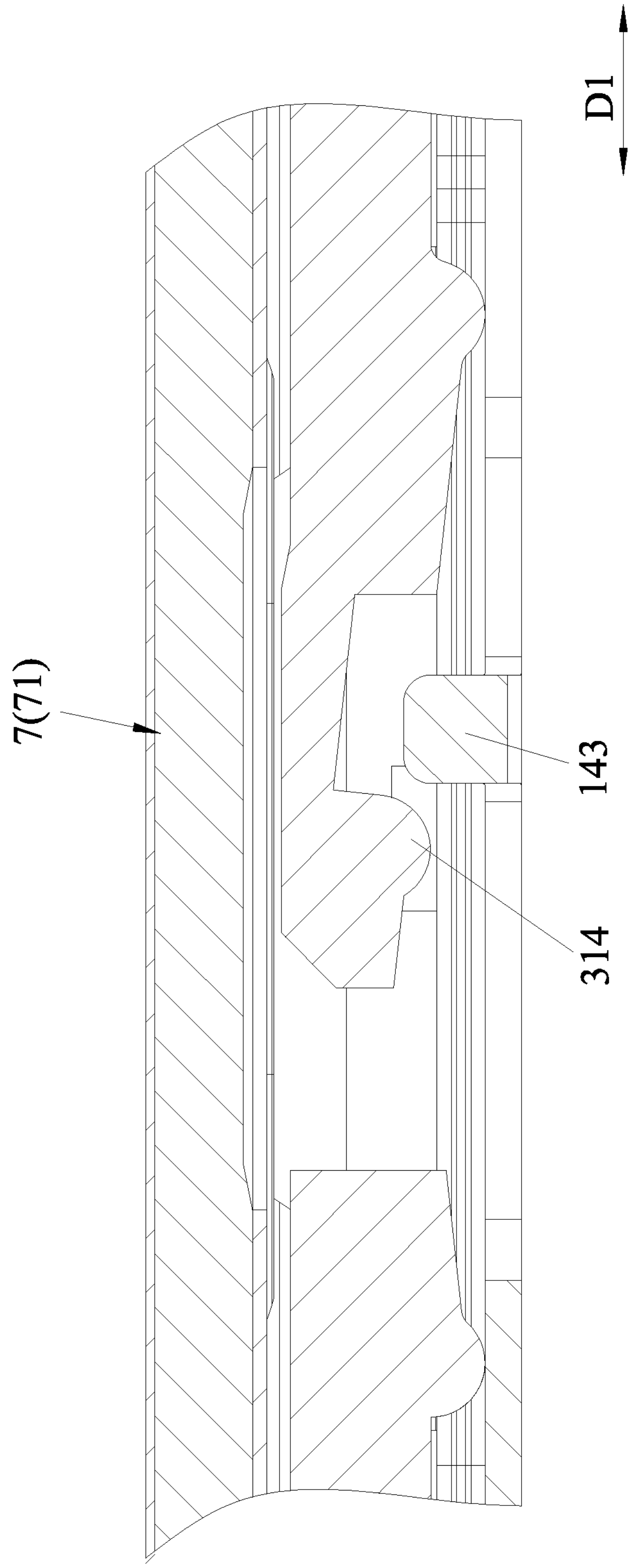
FIG. 15 is a view similar to FIG. 13, but with the keycap in the depressed position.

Referring to FIGS. 11A, 12A and 13, in combination with FIG. 10, when the keycap 7 is in the non-depressed position, the elastic body 22 elastically biases the keycap 7, and the keycap 7 and the first and second bight portions 312, 322 are away from the plate body 11. Furthermore, the first bight portion 312 abuts against the first stop walls 121, the second bight portion 322 abuts against the second stop walls 131, the first engaging blocks 313 respectively abut against the first limiting portions 141, and the second engaging blocks 323 respectively abut against the second limiting portions 142. Each first engaging block 313 and a respective one of the second engaging blocks 323 define a first distance (W1) therebetween. Moreover, the second protruding portions 324 respectively abut against the fourth limiting portions 144 of the limiting assemblies 14 in a direction toward the second bight portion 322, the first protruding portions 314 respectively abut against the third limiting portions 143 of the limiting assemblies 14 in a direction toward the first bight portion 312, and the curved surface 432 of each first protruding pin 43 abuts downwardly against a side of the lower surface 45 of a respective one of the first pivot grooves 41 which is away from the first bight portion 312, while the planar surface 431 thereof is spaced apart from the upper surface 44 of the respective first pivot groove 41. Additionally, the curved surface 532 of each second protruding pin 53 abuts downwardly against a side of the lower surface 55 of a respective one of the second pivot grooves 51 which is away from the second bight portion 322, while the planar surface 531 thereof is spaced apart from the upper surface 54 of the respective second pivot groove 51. At this time, the first and second stop walls 121, 131 and the limiting assemblies 14 stably fix the position of the first and second frame members 31, 32.

Figure 11B:
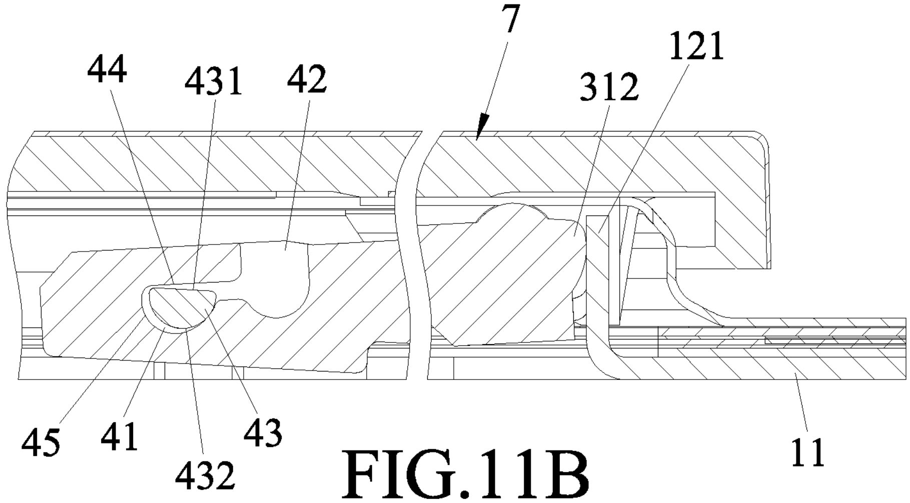
FIG. 11B is a view similar to FIG. 11A, but illustrating how the keycap moves from the non-depressed position to a depressed position.
Figure 11C:
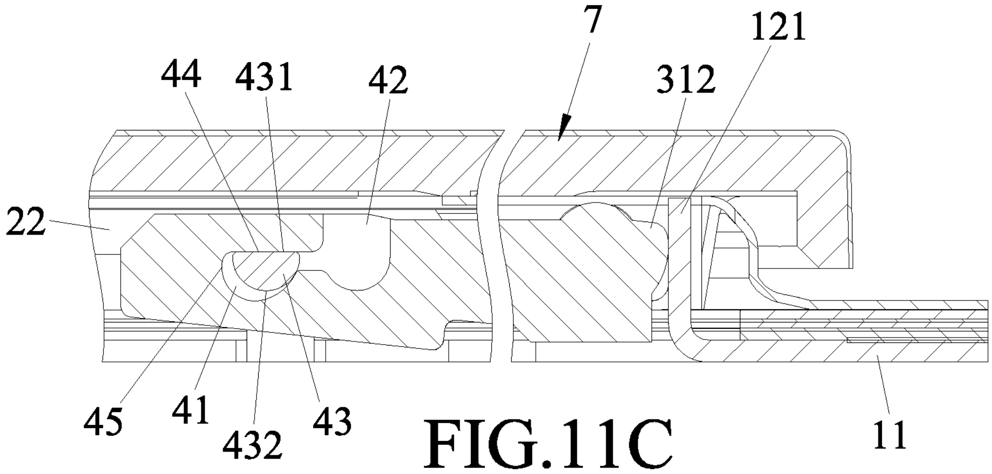
FIG. 11C is a view similar to FIG. 11B, but illustrating the keycap in the depressed position.
Figure 12B:
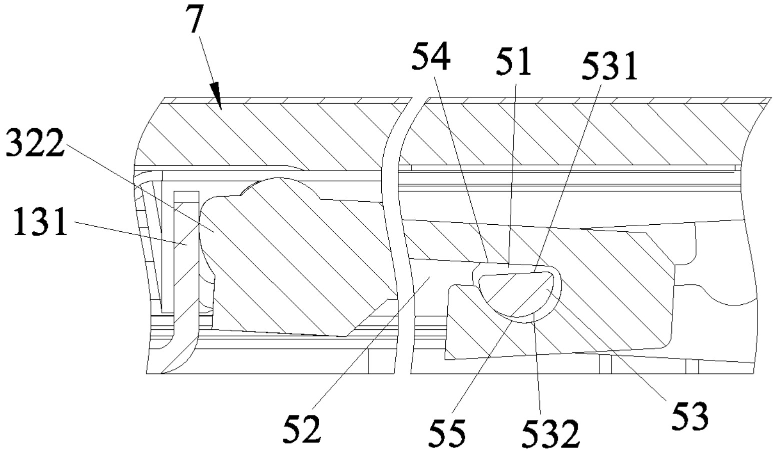
FIG. 12B is a view similar to FIG. 12A, but illustrating how the keycap moves from the non-depressed position to the depressed position.
Figure 12C:
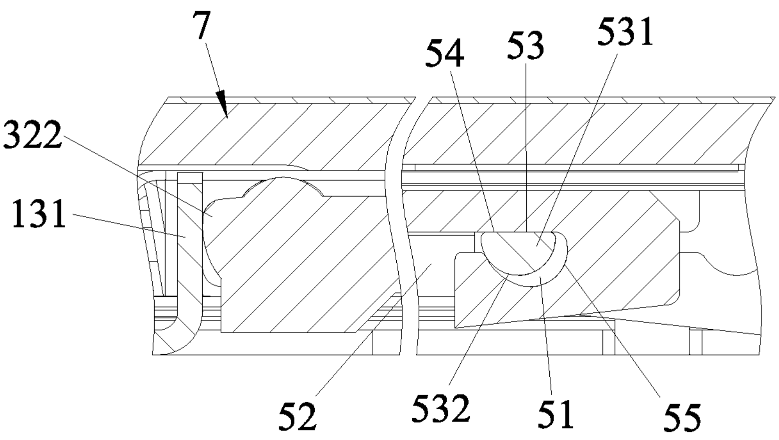
FIG. 12C is a view similar to FIG. 12B, but illustrating the keycap in the depressed position.

Referring to FIGS. 11B and 12B, in combination with FIG. 10, when the keycap 7 is moved from the non-depressed position to the depressed position, the first bight portion 312 abuts against the first stop walls 121 and moves straight down toward the plate body 11, and the second bight portion 322 abuts against the second stop walls 131 and moves straight down toward the plate body 11. Furthermore, the curved surface 432 of each first protruding pin 43 slides down along the lower surface 45 of the respective first pivot groove 41 in a direction toward the first bight portion 312, and the curved surface 532 of each second protruding pin 53 slides down along the lower surface 55 of the respective second pivot groove 51 in a direction toward the second bight portion 322. Since the cross sections of the first and second engaging grooves 721, 731 are circular, at this time, each first engaging pin 315 can only rotate relative to the respective first engaging portion 72 and cannot move relative to the same in the left-right direction (D1), and each second engaging pin 325 can only rotate relative to the respective second engaging portion 73 and cannot move relative to the same in the left-right direction (D1).

Referring to FIGS. 11C, 12C, 14 and 15, when the keycap 7 is in the depressed position, the keycap 7 and the first and second bight portions 312, 322 are adjacent to the plate body 11, and the elastic body 22 is compressed to store a restoring force. Furthermore, the planar surface 431 of each first protruding pin 43 abuts upwardly against a side of the upper surface 44 of the respective first pivot groove 41 which is adjacent to the first bight portion 312, and the curved surface 432 thereof abuts against a side of the lower surface 45 of the respective first pivot groove 41 which is adjacent to the first bight portion 312. At this time, each first protruding pin 43 is adjacent to the respective first notch 42 and is spaced apart from the side of the lower surface 45 of the respective first pivot groove 41 which is away from the first bight portion 312, and the first bight portion 312 abuts against the first stop walls 121. Moreover, the planar surface 531 of each second protruding pin 53 abuts upwardly against a side of the upper surface 54 of the respective second pivot groove 51 which is adjacent to the second bight portion 322, and the curved surface 532 thereof abuts against a side of lower surface 55 of the respective second pivot groove 51 which is adjacent to the second bight portion 322. At this time, each second protruding pin 53 is adjacent to the respective second notch 52 and is spaced apart from the side of the lower surface 55 of the respective second pivot groove 51 which is away from the second bight portion 322, and the second bight portion 322 abuts against the second stop walls 131. Each first engaging block 313 is moved away from a respective one of the first limiting portions 141, each second engaging block 323 is moved away from a respective one of the second limiting portions 142, and each first engaging block 313 and the respective second engaging block 323 define a second distance (W2) therebetween smaller than the first distance (W1). The second protruding portions 324 are respectively away from the fourth limiting portions 144. The first protruding portions 314 are respectively away from the third limiting portions 143. At this time, the first and second stop walls 121, 131 limit the first and second frame members 31, 32 from moving away from each other along the left-right direction (D1).

It can be seen from the above description that, observing the first frame member 31, when the keycap 7 is moved downward, the first bight portion 312 abuts against the first stop walls 121, and the first engaging grooves 721 restrict the first engaging pins 315 from moving in the left-right direction (D1), so that the first protruding pins 43 can stably move in the respective first pivot grooves 41 along the lower surfaces 45 thereof toward a side of the second frame member 32, and the first engaging pins 315 and the first bight portion 312 can move straight down toward the plate body 11.

Similarly, observing the second frame member 32, when the keycap 7 is moved downward, the second bight portion 322 abuts against the second stop walls 131, and the second engaging grooves 731 restrict the second engaging pins 325 from moving in the left-right direction (D1), so that the second protruding pins 53 can stably move in the respective second pivot grooves 51 along the lower surfaces 55 thereof toward a side of the first frame member 31, and the second engaging pins 325 and the second bight portion 322 can move straight down toward the plate body 11. Hence, even if the corner of the keycap 7 is pressed, the shaking of the keycap 7 in the left-right direction (D1) during downward movement thereof can be reduced, so that the level and stability of the keycap 7 when moving downward can be maintained.

Furthermore, when the keycap 7 is released, the first and second frame members 31, 32 are restored to their initial positions through the restoring force of the elastic body 22, the third limiting portions 143 can limit the movement of the first frame member 31 in the left-right direction (D1), and the fourth limiting portions 144 can limit the movement of the second frame member 32 in the left-right direction (D1), thereby preventing the positions of the first and second frame members 31, 32 from being displaced after restoring to the initial positions compared with the positions before being depressed.

In summary, in the low-travel key device 100 of this disclosure, by virtue of the abutment of the first bight portion 312 against the first stop set 12 and the abutment of the second bight portion 322 against the second stop set 13, when the keycap 7 is depressed or released, the first and second bight portions 312, 322 can be maintained to move straight down or up so as to enhance the stability of the action of the frame unit 3. Therefore, the object of this disclosure can certainly be achieved.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A low-travel key device, comprising:

a base plate unit including a plate body, a first stop set extending upwardly from said plate body, and a second stop set extending upwardly from said plate body and spaced apart from said first stop set in a left-right direction;

a frame unit located between said first stop set and said second stop set and including a first frame member and a second frame member, said first frame member including two first support arms spaced apart from each other in a front-rear direction transverse to the left-right direction, and a first bight portion connected between said first support arms and adjacent to said first stop set, each of said first support arms having a first end portion, and a first arm portion connected between said first end portion and said first bight portion, said second frame member including two second support arms spaced apart from each other in the front-rear direction, and a second bight portion connected between said second support arms and adjacent to said second stop set, each of said second support arms having a second end portion pivotally connected to said first end portion of a respective one of said first support arms, and a second arm portion connected between said second end portion and said second bight portion; and a keycap connected to said first bight portion and said second bight portion such that said first bight portion and said second bight portion are rotatable relative to said keycap and such that said keycap is movable relative to said plate body between a non-depressed position and a depressed position;

when said keycap is in said non-depressed position, said keycap, said first bight portion and said second bight portion are away from said plate body;

when said keycap is moved from said non-depressed position to said depressed position, said first bight portion and said second bight portion respectively abut against said first stop set and said second stop set and move straight down toward said plate body; and when said keycap is in said depressed position, said keycap is adjacent to said plate body and said first bight portion and said second bight portion respectively abut against said first stop set and said second stop set and are adjacent to said plate body.

2. The low-travel key device as claimed in claim 1, wherein said first stop set has two first stop walls that extend upwardly from said plate body that are spaced apart from each other in the front-rear direction and that abut against said first bight portion, said second stop set having two second stop walls that extend upwardly from said plate body that are spaced apart from each other in the front-rear direction and that abut against said second bight portion.

3. The low-travel key device as claimed in claim 1, wherein said first frame member further includes two first engaging pins disposed on two opposite sides of said first bight portion in the front-rear direction, said second frame member further including two second engaging pins disposed on two opposite sides of said second bight portion in the front-rear direction, each of said first engaging pins and said second engaging pins being cylindrical, said keycap including a cap body, two first engaging portions disposed on said cap body, and two second engaging portions disposed on said cap body spaced apart from said first engaging portions, each of said first engaging portions having a first engaging groove engaging a respective one of said first engaging pins, said first engaging groove of each of said first engaging portions having a circular cross section that matches with a shape of said respective one of said first engaging pins such that each of said first engaging pins is rotatable relative to said first engaging groove of a respective one of said first engaging portions, but is not movable relative to said first engaging groove of the respective one of said first engaging portions in the left-right direction, each of said second engaging portions having a second engaging groove engaging a respective one of said second engaging pins, said second engaging groove of each of said second engaging portions having a circular cross section that matches with a shape of said respective one of said second engaging pins such that each of said second engaging pins is rotatable relative to said second engaging groove of a respective one of said second engaging portions, but is not movable relative to said second engaging groove of the respective one of said second engaging portions in the left-right direction.

4. The low-travel key device as claimed in claim 1, further comprising a first pivot connecting unit, said first pivot connecting unit including two first pivot grooves extending inwardly and respectively from outer lateral sides of said first end portions of said first support arms, and two first protruding pins respectively disposed on inner lateral sides of said second end portions of said second support arms and respectively and rotatably engaging said first pivot grooves, each of said first pivot grooves being cooperatively defined by an upper surface and a lower surface located below said upper surface, wherein, when said keycap is in said non-depressed position, each of said first protruding pins abuts downwardly against a side of said lower surfaces of a respective one of said first pivot grooves which is away from said first bight portion and is spaced apart from said upper surface of the respective one of said first pivot grooves, and wherein, when said keycap is in said depressed position, each of said first protruding pins abuts upwardly against a side of said upper surface of the respective one of said first pivot grooves which is adjacent to said first bight portion and is spaced apart from said side of said lower surface of the respective one of said first pivot grooves which is away from said first bight portion.

5. The low-travel key device as claimed in claim 4, wherein said upper surface of each of said first pivot grooves is planar, and said lower surface of each of said first pivot grooves is concave.

6. The low-travel key device as claimed in claim 5, wherein each of said first protruding pins is semi-cylindrical, and has a curved surface facing said lower surface of the respective one of said first pivot grooves, and a planar surface facing said upper surface of the respective one of said first pivot grooves, wherein, when said keycap is in said non-depressed position, said curved surface of each of said first protruding pins abuts against said lower surface of the respective one of said first pivot grooves, wherein, when said keycap moves from said non-depressed position to said depressed position, said curved surface of each of said first protruding pins slides along said lower surface of the respective one of said first pivot grooves in a direction toward said first bight portion, and wherein, when said keycap is in said depressed position, said planar surface of each of said first protruding pins abuts against said upper surface of the respective one of said first pivot grooves, and said curved surface of each of said first protruding pins abuts against a side of said lower surface of the respective one of said first pivot grooves which is adjacent to said first bight portion.

7. The low-travel key device as claimed in claim 4, further comprising a second pivot connecting unit, said second pivot connecting unit including two second pivot grooves extending inwardly and respectively from inner lateral sides of said second end portions of said second support arms, and two second protruding pins respectively disposed on said outer lateral sides of said first end portions of said first support arms and respectively and rotatably engaging said second pivot grooves, each of said second pivot grooves being cooperatively defined by an upper surface and a lower surface located below said upper surface of a respective one of said second pivot grooves, each of said first pivot grooves being located between said first bight portion and one of said second protruding pins, each of said second pivot grooves being located between said second bight portion and one of said first protruding pins, wherein, when said keycap is in said non-depressed position, each of said second protruding pins abuts downwardly against a side of said lower surface of the respective one of said second pivot grooves which is away from said second bight portion and is spaced apart from said upper surface of the respective one of said second pivot grooves, wherein, when said keycap is in said depressed position, each of said second protruding pins abuts upwardly against a side of said upper surface of the respective one of said second pivot grooves which is adjacent to said second bight portion and each of said second protruding pins is spaced apart from said side of said lower surface of the respective one of said second pivot grooves which is away from said second bight portion.

8. The low-travel key device as claimed in claim 1, wherein said base plate unit further includes two limiting assemblies disposed on said plate body between said first stop set and said second stop set and spaced apart from each other in the front-rear direction, each of said limiting assemblies including a first limiting portion protruding upwardly from said plate body and defining an engaging groove, and a second limiting portion that protrudes upwardly from said plate body, that is spaced apart from said first limiting portion in the left-right direction and that defines an engaging groove facing said engaging groove of said first limiting portion, said first frame member further including two first engaging blocks respectively connected to outer lateral sides of said first arm portions of said first support arms and engaging movably and respectively said engaging grooves of said first limiting portions of said limiting assemblies in the left-right direction, said second frame member further including two second engaging blocks respectively connected to outer lateral sides of said second arm portions of said second support arms and engaging movably and respectively said engaging grooves of said second limiting portions of said limiting assemblies in the left-right direction, wherein, when said keycap is in said non-depressed position, said first engaging blocks respectively abut against said first limiting portions, said second engaging blocks respectively abut against said second limiting portions, and each of said first engaging blocks and a respective one of said second engaging blocks define a first distance therebetween, and wherein, when said keycap is in said depressed position, each of said first engaging blocks is moved away from a respective one of said first limiting portions, each of said second engaging blocks is moved away from a respective one of said second limiting portions, and each of said first engaging blocks and said respective one of said second engaging blocks define a second distance therebetween smaller than said first distance.

9. The low-travel key device as claimed in claim 8, wherein each of said limiting assemblies further includes a third limiting portion protruding upwardly from said plate body and located spaced apart from said first limiting portion and said second limiting portion in the front-rear direction, said first frame member further including two first protruding portions respectively disposed on inner lateral sides of said first end portions of said first support arms, each of said first protruding portions being located between said second stop set and said third limiting portion of one of said limiting assemblies, wherein, when said keycap is in said non-depressed position, said first protruding portions respectively abut against said third limiting portions of said limiting assemblies in a direction toward said first bight portion, and wherein, when said keycap is in said depressed position, said first protruding portions are respectively away from said third limiting portions.

10. The low-travel key device as claimed in claim 9, wherein each of said limiting assemblies further includes a fourth limiting portion protruding upwardly from said plate body and located between said first limiting portion and said second limiting portion, said fourth limiting portion and said third limiting portion being staggered relative to each other in the front-rear direction said second frame member further including two second protruding portions respectively disposed on outer lateral sides of said second end portions of said second support arms, each of said second protruding portions being located on a same side as a respective one of said second engaging blocks and being located between said fourth limiting portion and said first limiting portions of a corresponding one of said limiting assemblies, wherein, when said keycap is in said non-depressed position, said second protruding portions respectively abut against said fourth limiting portions of said limiting assemblies in a direction toward said second bight portion, and wherein, when said keycap is in said depressed position, said second protruding portions are respectively away from said fourth limiting portions.

* * * * *